United States Patent [19]
Kawamoto et al.

[11] 3,864,610
[45] Feb. 4, 1975

[54] SPEED CONTROL DEVICE FOR BRUSHLESS DC MOTOR

[75] Inventors: Nobuhiko Kawamoto; Tositaka Nakajima; Tomoyuki Okubo, all of Kawasaki, Japan

[73] Assignee: Fuji Electric Company Limited, Kanagawa, Japan

[22] Filed: June 28, 1973

[21] Appl. No.: 374,435

[30] Foreign Application Priority Data
June 30, 1972  Japan.............................. 47-65762

[52] U.S. Cl................. 318/317, 318/254, 318/696, 318/138
[51] Int. Cl. ......................................... H02k 29/00
[58] Field of Search ............ 318/254, 696, 317, 138

[56] References Cited
UNITED STATES PATENTS
| | | | |
|---|---|---|---|
| 3,622,851 | 11/1971 | Hanada | 318/254 X |
| 3,651,368 | 3/1972 | Hanada | 318/254 |
| 3,716,769 | 2/1973 | Brunner | 318/254 |
| 3,757,183 | 9/1973 | Nola | 318/254 |
| 3,767,986 | 10/1973 | Wada | 318/254 X |

*Primary Examiner*—B. Dobeck
*Attorney, Agent, or Firm*—Sughrue, Rothwell, Mion, Zinn & Macpeak

[57] ABSTRACT

A brushless d.c. motor is provided with a permanent magnet rotor and N's stator windings separated in space by 360°/N. A transistor is connected in series with each winding. A Hall element is connected to the base of each transistor. The magnetic field of the rotor controls the Hall voltages of the Hall elements so that the transistors are rendered conducting at intervals separated by 360°/N. Each transistor remains conducting for a period of 180° to energize its associated stator winding. A speed detecting circuit including a capacitor is connected to one of phase windings so that the capacitor is charged to a voltage corresponding to the motor speed. As the motor speed varies, the corresponding change in capacitor voltage is used to control the conduction of the transistors, and thereby the current flowing through the windings, so that the motor speed is returned to a preset value.

6 Claims, 3 Drawing Figures 3,864,610

SPEED CONTROL DEVICE FOR BRUSHLESS DC MOTOR

FIELD OF THE INVENTION

This invention relates generally to a speed control device for a brushless d.c. motor having a permanent magnet rotor and a stator having stator windings energized by d.c. power supply, and more particularly to such a device for controlling the energizing phase of the stator windings in response to the rotating position of the rotor.

SUMMARY OF THE INVENTION

The object of the invention is to provide a speed control device which is simple in structure and which can maintain a constant motor speed without using special additional speed detecting elements such as, for example, a speed tachometer generator, a speed detecting winding, etc.

In order to achieve the aforementioned object, the present invention provides for a brushless d.c. electric motor having means for detecting the energizing period of the stator winding of the motor, means for converting the detected period to a corresponding voltage amplitude, means for comparing the converted voltage with a preset voltage corresponding to a set speed so as to control the amplitude of the current in said stator winding in response to the deviation of the comparison.

DETAILED DESCRIPTION OF THE PREFERRED EMBODIMENT

Figure 1:
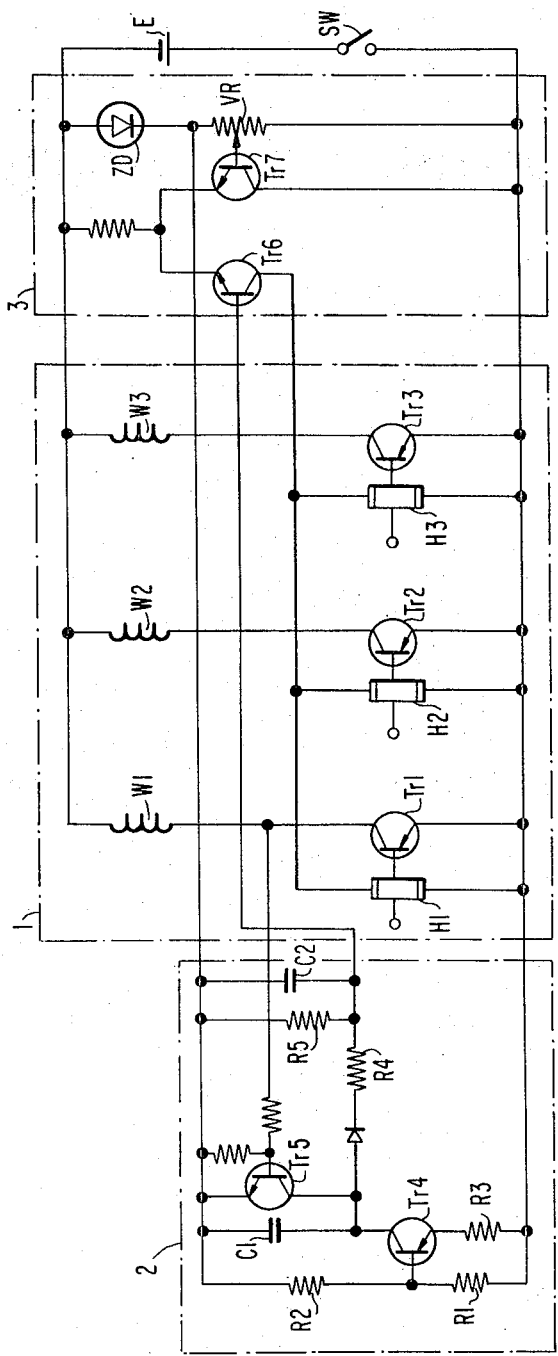
FIG. 1 and 3 are schematic circuit diagrams of two embodiments of the present invention.

FIG. 1 shows an electric circuit diagram of one embodiment of the present invention. A brushless electric motor 1 is connected in parallel with a d.c. power supply E. The motor 1 has three stator windings W1, W2 and W3 connected in series with each of the transistors Tr1, Tr2, and Tr3 (non-contacting or electronic switches) whose conduction is controlled by Hall elements H1, H2 and H3 which in turn detect the angular position of the motor's permanent magnet rotor (not shown) relative to said stator windings W1, W2 and W3.

The stator windings having three phases in structure are shown in this embodiment.

In general, stator windings of N's phases structure can be obtained by means of providing the armature windings spaced apart by 360°/N one another. In such case, it is required to provide N each transistor and N each Hall element.

A speed detecting circuit 2 for detecting the energizing period of one stator winding includes: a transistor Tr5 having its base coupled to one end of the stator winding W1; a constant current charging circuit consisting of a capacitor C1, resistors R1, R2 and R3 and a transistor Tr4; a smoothing circuit consisting of resistors R4 and R5 and a capacitor C2; and a comparing circuit 3 in which a preset voltage from a speed regulator VR is compared with the output voltage of the speed detecting circuit 2 by the differential amplifier composed of transistors Tr6 and Tr7 so as to adjust the control current of the Hall elements H1, H2 and H3. ZD is a constant voltage diode for holding constant the voltage of the speed detecting circuit 2 and speed regulator (potentiometer) VR, and SW is a power supply switch.

The device of FIG. 1 operates as follows: The Hall elements H1, H2 and H3 are spaced apart by 120° in the magnetic field formed by the rotor (not shown) in the brushless electric motor 1, and are controlled by the magnetic field of the rotor; therefore, the transistors Tr1, Tr2 and Tr3 are sequentially rendered conducting at 120° electrical phase intervals. Each transistor remains conducting for a period of 180° to energize its associated stator winding W1, W2 or W3 for the corresponding 180° period. Consequently, a periodic voltage is induced in the stator windings as shown in the lines labeled W1, W2 and W3 in FIG. 2. The time period T of the induced voltages in the respective windings varies depending upon the motor speed, and the faster the speed of the motor is, the smaller the period T becomes, and vice versa.

Transistor Tr5 is connected to the stator winding W1 for detecting the period of energization of the winding and conducts only while the transistor Tr1 is conducting and thereby permitting winding W1 to be energized. Therefore, the capacitor C1 of the constant current charging circuit is shortcircuited by transistor Tr5 during half of the energizing period T of the winding W1; accordingly, capacitor C1 is charged and discharged in synchronization with the energizing period T. Thus, the terminal voltage of the capacitor C1 varies as shown by Vc1 in FIG. 2.

If the motor speed is now constant, the energizing period T of the winding W1 is constant, and, therefore, the charging time of the capacitor C1 also becomes constant so that the capacitor C1 is periodically charged to a constant voltage. The smoothing circuit, consisting of the resistors R4 and R5 and the capacitor C2, smoothens the periodically varying terminal voltage Vc1 of capacitor C1 to produce the voltage Vc2 corresponding to the mean value of the terminal voltage Vc1 of the capacitor C1 as shown by Vc2 in FIG. 2, and, therefore, when the motor speed is constant, this voltage Vc2 also becomes substantially constant.

Figure 2:
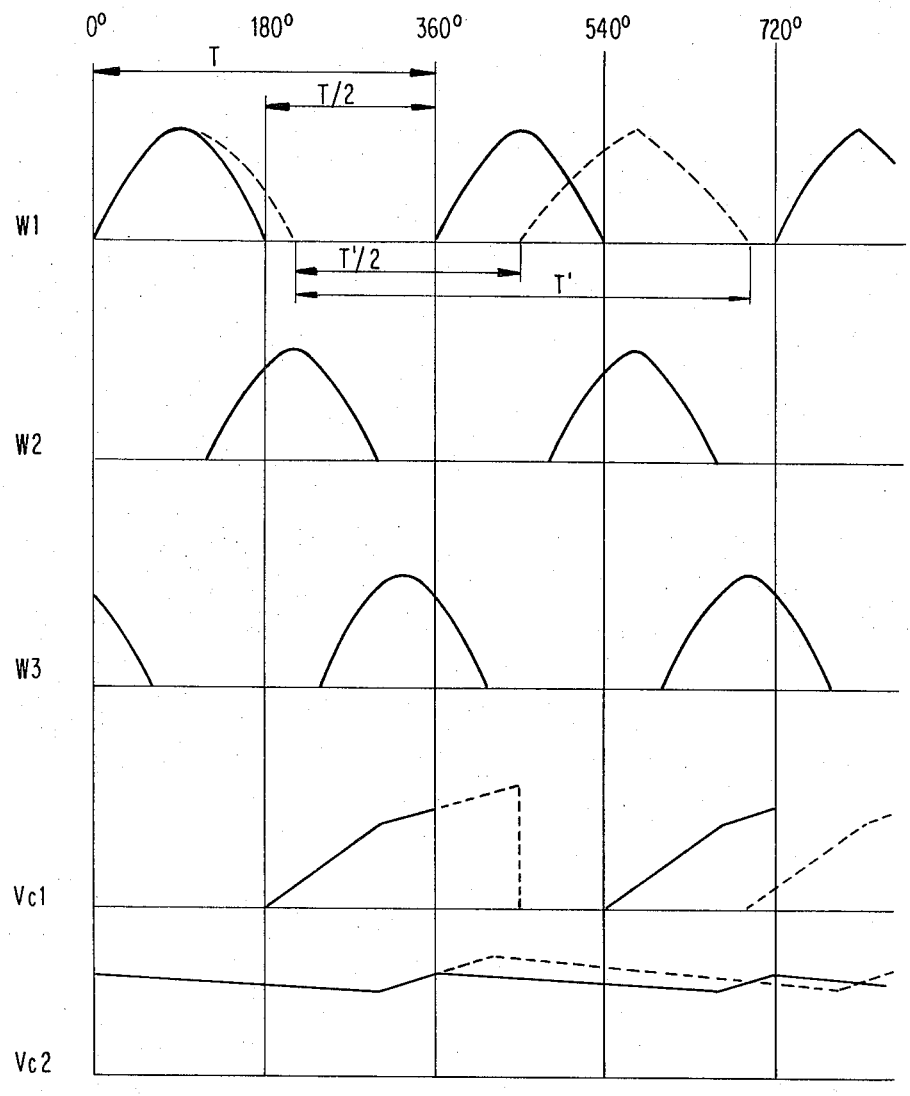
FIG. 2 is a graphical representation of voltage-versus-time for use in conjunction with the description of the operation of this invention.

If the motor speed is reduced for any reason, the induced voltage in the winding W1 is varied as shown by dotted line at the winding W1 in FIG. 2, so that the energizing period of the winding W1 become T' with the result that it becomes longer than the previous period T. Accordingly, since the charging time of the capacitor C1 also becomes longer, the charged voltage of the capacitor C1 becomes correspondingly higher as shown by the dotted line at Vc1 in FIG. 2. Therefore, the terminal voltage of the capacitor C2 of the smoothing circuit also becomes higher as shown by dotted line at Vc2 in FIG. 2. Accordingly, the voltage Vc2 of both ends of the capacitor C2 has a value dependent on the motor speed.

The terminal voltage Vc2 of the capacitor C2 is applied to the base of the transistor Tr6 of the differential amplifier in the comparing circuit 3. This voltage is compared with a set voltage determined by the setting of the potentiometer speed regulator VR. Thus, if the motor speed is decreased so that the voltage Vc2 is increased in response thereto, the base potential of the transistor Tr6 is increased so that the collector current of the transistor Tr6 is increased, with the result that the control current of each of the Hall elements H1, H2 and H3 is increased. Thus, the Hall voltages of the Hall elements become larger, the base potentials of the transistors Tr1, Tr2 and Tr3 become higher than before, thereby increasing the currents flowing through the windings W1, W2 and W3 so as to increase the motor speed. On the contrary, when the motor speed becomes higher than the set speed, the output voltage of the speed detecting circuit 2 is decreased so that the comparing circuit 3 reduces the control current of each of the Hall elements H1 to H3, thereby causing a decrease in the motor speed. Therefore, the motor speed is maintained constant at a preset value determined by the preset voltage from VR.

Figure 3:
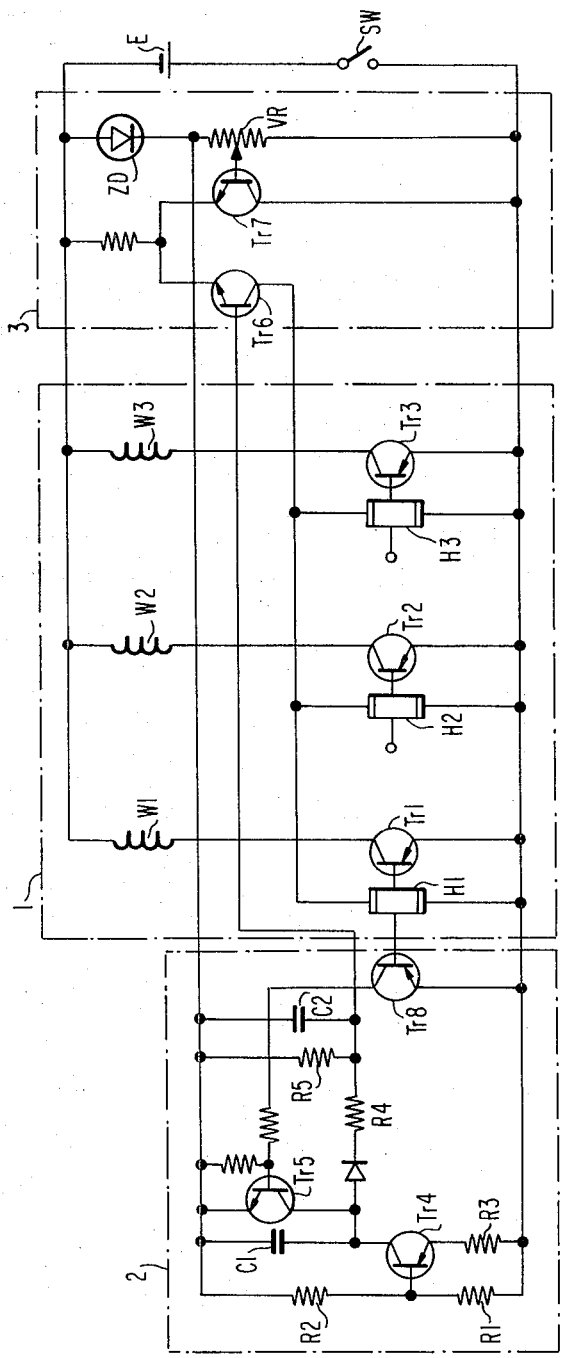

Though the voltage of the stator winding W1 is applied to the transistor Tr5 for detecting the energizing period of the stator winding in the embodiment of this invention in FIG. 1, the energizing period of the stator winding may be detected similar to the case of the embodiment shown in FIG. 1, even if the output voltage of the Hall element for detecting the rotor position is applied through the transistor Tr8 to the transistor Tr5 as shown in FIG. 3. The rest of the circuit shown in FIG. 3 is the same as that shown in FIG. 1, and accordingly the description of the operation thereof is omitted.

As seen from the foregoing description, according to the present invention, the motor speed is detected by detecting the energizing period of the stator winding, it is not necessary to provide a separate speed detector, such as speed detecting winding, speed generator, etc., and therefore the device of this invention is compact and simple in construction.

While the invention has been particularly shown and described with reference to the preferred embodiment thereof, it will be understood by those skilled in the art that various changes in form and details may be made therein without departing from the spirit and scope of the invention.

We claim:

1. A speed control device for a brushless d.c. electric motor including a permanent magnet rotor and a stator having stator winding means energized by a d.c. power supply, comprising switch means for controlling the energizing phase of said stator winding means in response to the rotary position of the rotor, means for detecting the energizing time period of said stator winding means, means for converting the detected period to a corresponding voltage amplitude, means for comparing the converted voltage amplitude with a preset voltage amplitude corresponding to a set speed to produce an error signal for controlling the amplitude of the current in said stator winding means in response to the difference between said converted voltage amplitude and said preset voltage to maintain the motor speed at said set speed.

2. A speed control device as defined in claim 1 wherein said switch means comprises transistor means connected in series with said stator winding means, Hall element means connected to said transistor means and responsive to the magnetic field of said rotor to control the phase of conduction of said transistor means, said Hall element means being responsive to said error signal for controlling the degree of conduction of said transistor means, and thereby the current amplitude in said stator winding means.

3. A speed control device as defined in claim 2 wherein said detecting means comprises a capacitor coupled to said stator winding means so that the capacitor is charged to a voltage corresponding to said energizing time period of said winding means.

4. A speed control device as defined in claim 3 wherein said stator winding means comprises N stator windings physically separated by 360°/N, said transistor means comprises a transistor connected in series with each stator winding, said Hall element means comprises a Hall element connected to the base of each transistor, and further comprising circuit means coupling said capacitor to only one of said stator windings.

5. A speed-controlled device as defined in claim 4 wherein said coupling circuit means comprises another transistor having its output terminals connected across said capacitor and its control terminal connected to said one stator winding for controlling the charging and discharging of said capacitor.

6. A speed-controlled device as defined in claim 4 wherein said coupling circuit means comprises another transistor having its output terminals connected across said capacitor and its control terminal connected to the Hall element connected to the transistor which is in series with said one stator winding for controlling the charging and discharging of said capacitor.

* * * * *